(12) United States Patent
Brixius et al.

(10) Patent No.: US 7,104,387 B2
(45) Date of Patent: Sep. 12, 2006

(54) TRANSPORT SYSTEM, IN PARTICULAR AN AIRPORT LUGGAGE TRANSPORT SYSTEM, FOR CONTAINERS ADAPTED TO TRANSPORT INDIVIDUAL ITEMS

(75) Inventors: Wolfgang Brixius, Neunkirchen A.Br (DE); Dominik Gräfer, Dortmund-Wellinghofen (DE); Albrecht Hoene, Lappersdorf (DE)

(73) Assignee: Siemens Aktiengesellschaft, München (DE)

( * ) Notice: Subject to any disclaimer, the term of this patent is extended or adjusted under 35 U.S.C. 154(b) by 87 days.

(21) Appl. No.: 10/935,716

(22) Filed: Sep. 7, 2004

(65) Prior Publication Data

US 2005/0072653 A1    Apr. 7, 2005

(30) Foreign Application Priority Data

Sep. 4, 2003    (DE)    ................... 103 40 868

(51) Int. Cl.
    B65G 47/10    (2006.01)
(52) U.S. Cl. .............................. 198/370.06
(58) Field of Classification Search .......... 198/370.01, 198/370.03, 370.06, 817
    See application file for complete search history.

(56) References Cited

U.S. PATENT DOCUMENTS

| | | | | |
|---|---|---|---|---|
| 3,231,068 A | * | 1/1966 | Harrison et al. | 198/370.06 |
| 3,912,071 A | * | 10/1975 | Nielsen | 198/370.06 |
| 4,096,936 A | * | 6/1978 | Nielsen | 198/370.06 |
| 4,781,281 A | * | 11/1988 | Canziani | 198/370.06 |
| 4,884,676 A | * | 12/1989 | Suizu | 198/370.06 |
| 5,547,084 A | * | 8/1996 | Okada et al. | 209/583 |
| 5,588,520 A | * | 12/1996 | Affaticati et al. | 198/370.06 |
| 5,690,209 A | * | 11/1997 | Kofoed | 198/370.06 |
| 5,701,992 A | * | 12/1997 | Enomoto | 198/370.06 |
| 5,901,830 A | * | 5/1999 | Kalm et al. | 198/370.06 |
| 6,273,268 B1 | * | 8/2001 | Axmann | 209/654 |
| 6,446,782 B1 | * | 9/2002 | Patrick | 198/370.06 |
| 6,698,571 B1 | * | 3/2004 | Bonnet | 198/370.02 |
| 6,820,561 B1 | * | 11/2004 | Soldavini et al. | 104/88.04 |
| 6,889,814 B1 | * | 5/2005 | Cerutti et al. | 198/358 |
| 6,938,750 B1 | * | 9/2005 | Miller et al. | 198/370.06 |
| 2002/0063037 A1 | | 5/2002 | Bruun et al. | |

FOREIGN PATENT DOCUMENTS

| | | |
|---|---|---|
| DE | 197 07 321 A1 | 8/1998 |
| EP | 0 393 773 A | 10/1990 |
| EP | 1 227 050 A1 | 7/2002 |

* cited by examiner

*Primary Examiner*—Douglas A. Hess
(74) *Attorney, Agent, or Firm*—Henry M. Feiereisen

(57) ABSTRACT

A transport system, in particular an airport luggage transport system, is disclosed that moves containers with individual items along a transport path. The system includes at least one support element that supports a bottom side of the containers along the transport path, guiding means, and loading and unloading means as well as a motion link located next to the passing containers. A pinwheel rotatably supported on the container has pins adapted to engage with the motion link. An endless conveyor belt revolves transversely to the transport direction and is driven by the pinwheel, whereby an upper belt section of the endless conveyor belt forms a support surface for the containers. The bottom side of the containers includes at least one groove-shaped recess oriented in the transport direction that engages with the guiding means at least at the loading and unloading location.

10 Claims, 4 Drawing Sheets

TRANSPORT SYSTEM, IN PARTICULAR AN AIRPORT LUGGAGE TRANSPORT SYSTEM, FOR CONTAINERS ADAPTED TO TRANSPORT INDIVIDUAL ITEMS

CROSS-REFERENCES TO RELATED APPLICATIONS

This application claims the priority of German Patent Application, Serial No. 103 40 868.1, filed Sep. 4, 2003, pursuant to 35 U.S.C. 119(a)–(d), the disclosure of which is incorporated herein by reference.

BACKGROUND OF THE INVENTION

The invention relates to a transport system, in particular and airport luggage transport system, for containers adapted to transport individual items.

EP 1227050 A1 discloses a system for transporting and sorting individual items transported along a transport path in containers. The guided containers are driven externally. Loading and unloading means are provided at corresponding loading and unloading stations, which include a motion link arranged next to the passing containers. The ends of a pinwheel rotatably supported on the container engage with the motion link when the containers pass by. The shifting gear turns of the pinwheel, whereby the straight motion of the container is converted into a rotary motion of the pinwheel. The pinwheel then drives a revolving endless conveyor belt extending transversely to the transport direction. The items are placed on the upper belt section of this conveyor belt, so that the container can be loaded and unloaded, respectively, depending on the direction of rotation. The loading and unloading function can be turned on or turned off by pivoting the motion link.

DE 197 07 321 A1 discloses a transport path for containers moving along the transport path. The containers are moved by way of conveyor belts, which are implemented as revolving endless flat belts and guided via deflection wheels. One side of the container is located on a conveyor belt which transmits a force to the container; the other side of the container is supported by freely rotating idler rollers. A guide rail, which cooperates with a corresponding pin-shaped guide element provided on the bottom side of the containers, is provided for guiding the containers. The guide element is guided in the guide rail and also prevents the containers from lifting from the transport path. Guiding is provided by the two longitudinal sides of the guide rail extending in the transport direction, which also prevents the containers to move in a transverse direction.

U.S. published patent application 2002/0063037 A1 discloses a transport system for transporting containers with individual items, such as luggage, along a transport path. The transport path includes a plurality of straight sections, whereby the bottom side of the containers rests with both sides on conveyor belts. Sidewalls are provided for orienting and guiding the containers which, however, disadvantageously does not controllably and securely guide the containers.

It would therefore be desirable to provide a transport system and suitable guiding means for the transport system that operate quietly and prevent component wear during loading and unloading of the containers.

SUMMARY OF THE INVENTION

According to an aspect of the invention, a transport system, in particular an airport luggage transport system, for externally moving containers with individual items along a transport path includes at least one support element supporting a bottom side of the containers along the transport path, guiding means having a straight guiding section extending in the transport direction, and loading and unloading means arranged along the transport path and including a motion link located next to the passing containers. The transport system further includes a pinwheel rotatably supported on the container, with pins that can engage with the motion link, whereby the motion link uses kinetic energy from the moving container to drive the pinwheel. An endless conveyor belt revolves transversely to the transport direction and is driven by the pinwheel, whereby an upper belt section of the endless conveyor belt forms a support surface for the containers. The bottom side of the containers includes at least one groove-shaped recess oriented in the transport direction that engages with a straight guiding section at least at the loading and unloading location.

Accordingly, the containers are restrictively guided by the straight guiding section, which reduces noise and wear, since the containers are guided in their center. This leads to a coordinated motion of the containers at the loading and unloading station, because the kinematics of the loading and unloading station matches the kinematics of the containers. This simple guiding mechanism is precise, so that the containers need no longer be accurately positioned at the loading and unloading station.

Guiding can be improved by making the straight guiding section longer than the containers.

A large throughput can be achieved by pivoting the motion link inward from the outside.

Advantageously, the rotation axis of the pinwheel can extend parallel to the transport direction, with the pins being uniformly spaced and extending radially from the rotation axis.

The drive can be improved by connecting a spur gear between the pinwheel and the upper conveyor belt.

Advantageously, the pitch and length of the motion link can be selected so that the endless conveyor belt executes at least half a revolution when passing the motion link.

Transport of the containers can be simplified by implementing the support element as a belt that directly supports the bottom side of the containers along the transport path Guiding can become more smooth by forming the straight guiding section with two opposing longitudinal sides that each include at least one lateral guiding section, whereby the lateral guiding sections are adapted to support the two corresponding opposing side faces of the groove-shaped recess.

In order to further reduce friction between the guiding section and the container, the lateral guiding sections can be formed as lateral guide rollers that protrude slightly from the longitudinal sides and roll along the opposing side faces of the groove-shaped recess.

For a more uniform guiding of the containers, a spaced-apart pair of lateral guide rollers can be arranged at least along one of the two opposing longitudinal sides.

Friction can be reduced by making the guiding section of a low-friction plastic.

According to another advantageous embodiment, at least one support element can include a side rail with two ends and end pieces disposed on both ends. The end pieces can be pushed over or inserted into the side rails. The belt can pass over rotatably supported guide rollers. A transport section of the belt can extend along a top side of the side rail and a return section of the belt can extend along a bottom side of the side rail.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
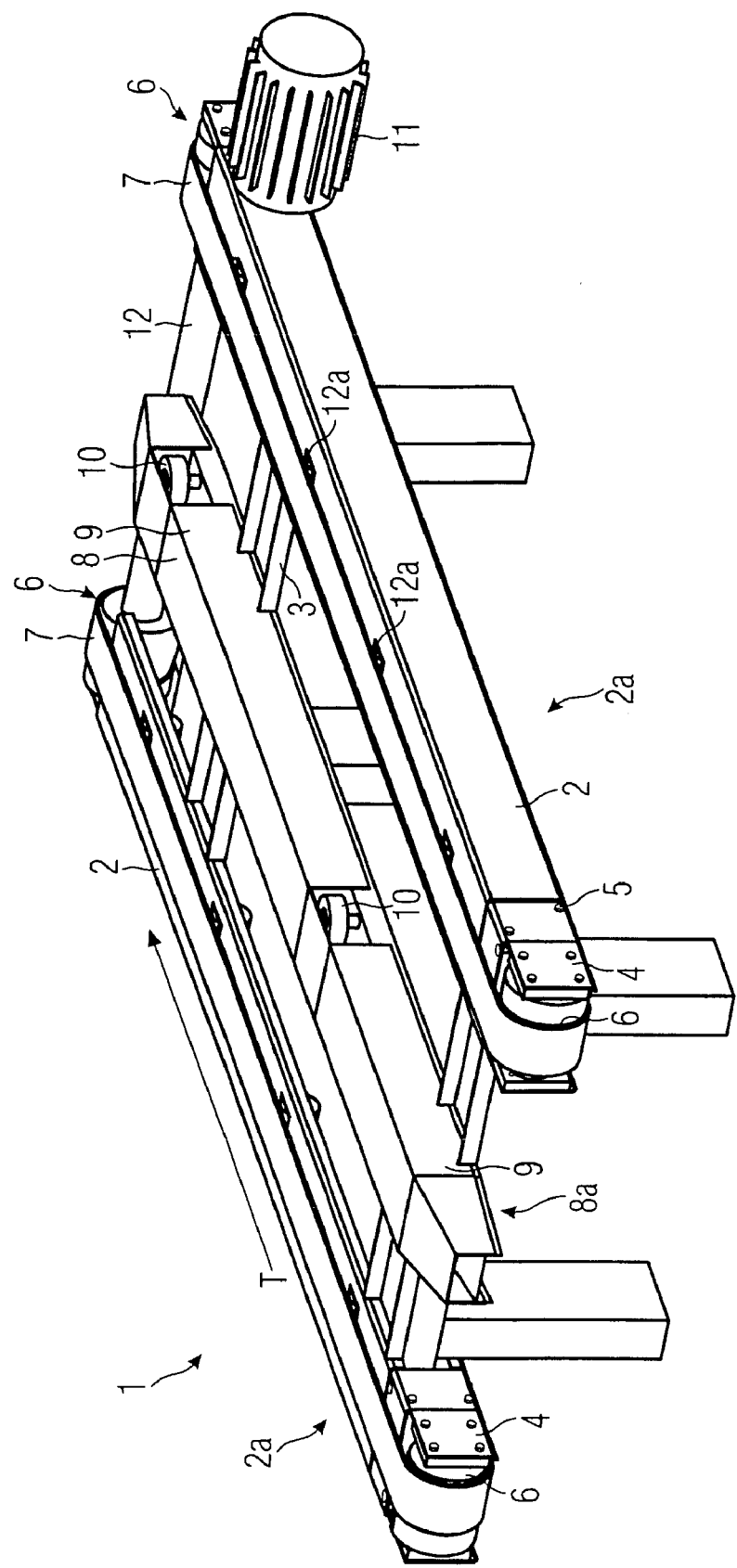
FIG. 1 shows a conveyor for the straight transport path section of a transport system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a conveyor 1 located in a straight transport path section of an airport luggage transport system (not shown). The luggage transport system transports individual items in containers 1a (see FIG. 2) in a transport direction T.

The conveyor 1 has to mutually parallel side rails 2, which are connected with each other by cross rails 3. An end piece 4 is inserted or placed on a corresponding front end of the side rails 2 (referring to the orientation depicted in FIG. 1), and secured on the side rail 2 by screws 5. The end pieces 4 connected in this way with the side rails 2 each form one end of the two side rails 2.

The four ends of the side rails 2 support crowned belt guiding rollers 6 for rotation, with an endless belt 7 guided over the crowned belt guiding rollers 6. During transport, the flat bottom side of the containers 1a rests on the two belts 7, with the side rails 2 operating as support elements 2a supporting the containers 1a. The section of the belts 7 supporting the containers extends along the top side of the side rails 2, whereas the return section extends along the bottom side of the side rail 2.

A guiding section 8 which extends parallel to the side rails 2 in the transport direction forms a guiding means 8a located centrally between the two side rails 2. The guiding section 8 is made of a low-friction plastic, but can also be made of a suitably shaped metal sheet. The guiding section 8 has a rectangular cross-section and ends that are slightly tapered in the transport direction.

As shown in FIG. 1, a pair of lateral guiding rollers 10 forming a lateral guiding section is located on the two longitudinal sides 9 of the guiding section 8 (FIG. 1 only shows the two front side rollers 10 facing the viewer; the rear side roller pair 10, 10 in FIG. 1 is obscured from view by the guiding section 8). Fixedly attached low-friction elements can also be used as lateral guiding sections. The lateral guiding rollers 10 protrude slightly from the longitudinal side faces of the longitudinal sides 9. The distance between the two metal guiding roller pairs 10, 10 is approximately equal to the container length. As schematically shown in FIG. 1, the two rear belt guiding rollers 6 are driven by a motor, of which only the drive pinion 11 is shown. The drive pinion 11 drives the shaft 12, on which the two rear belt guiding rollers 6 are placed in fixed rotative engagement with the shaft 12. If will be understood, that the side rollers 10 can also be actively driven and can operate as driving means.

The friction resistance of the belts 7 can be reduced by providing in the side rails 2 freely rotatable support rollers 12a that contact the belts 7.

Figure 2:
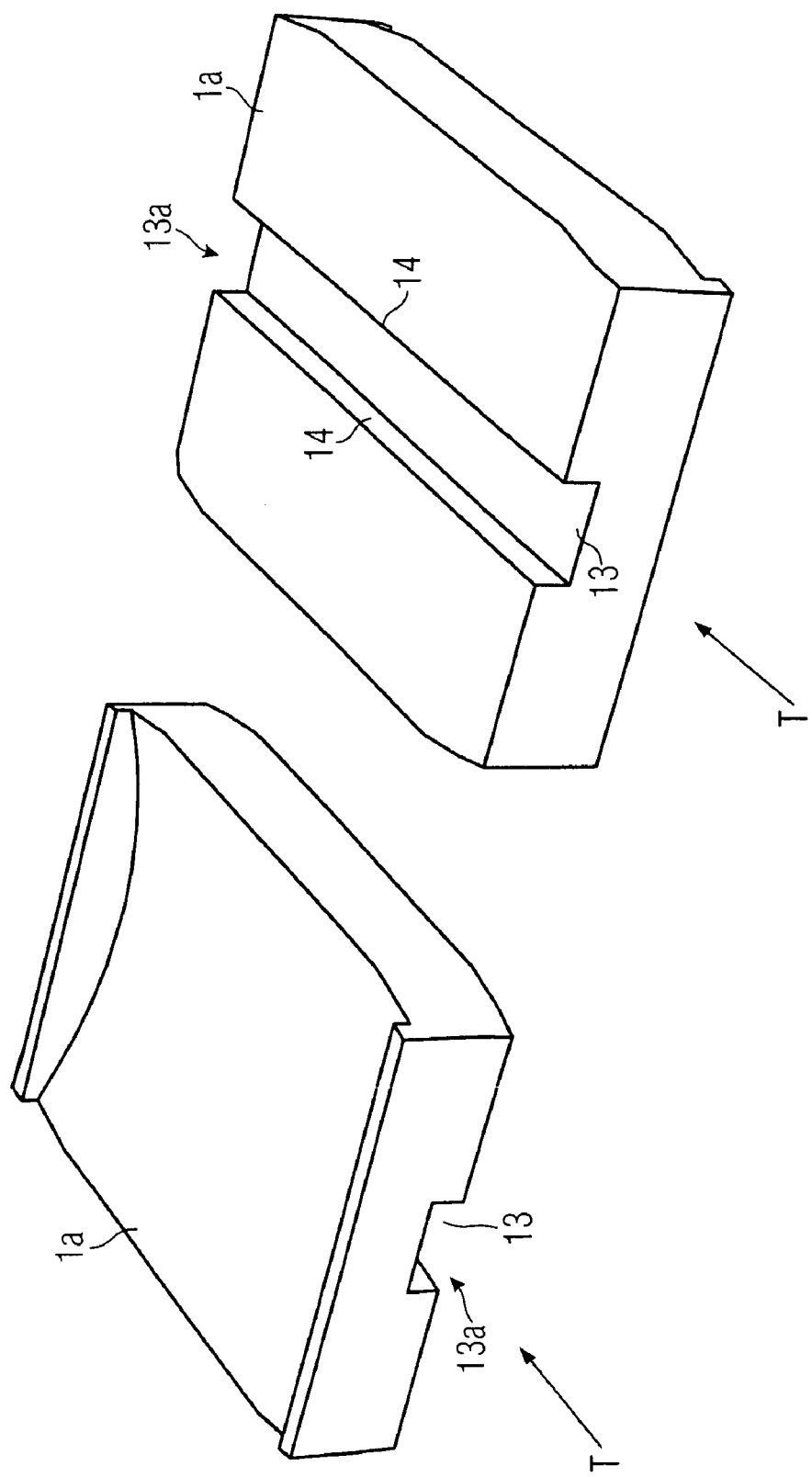
FIG. 2 shows a container suitable for the conveyor of FIG. 1.

The left side of FIG. 2 shows a top view of the container 1a, whereas the right side of FIG. 2 shows a bottom view. A longitudinal groove 13 is formed in the bottom side. The groove 13 is shaped as a recess with the two opposing lateral groove faces 14 and extends in the transport direction. When the container 1a passes over the conveyor 1, the guiding section 8 engages with the longitudinal groove 13, and the lateral guidance rollers 10 roll along the two opposing groove side faces 14.

As shown in FIG. 1, the two roller pairs 10, 10 are located—as viewed in the transport direction T—in the rear section of the guiding section 8. An incoming container 1a is then initially coarsely oriented by the guiding section 8, with the lateral guiding rollers 10 subsequently precisely aligning the container 1a.

Figure 3:
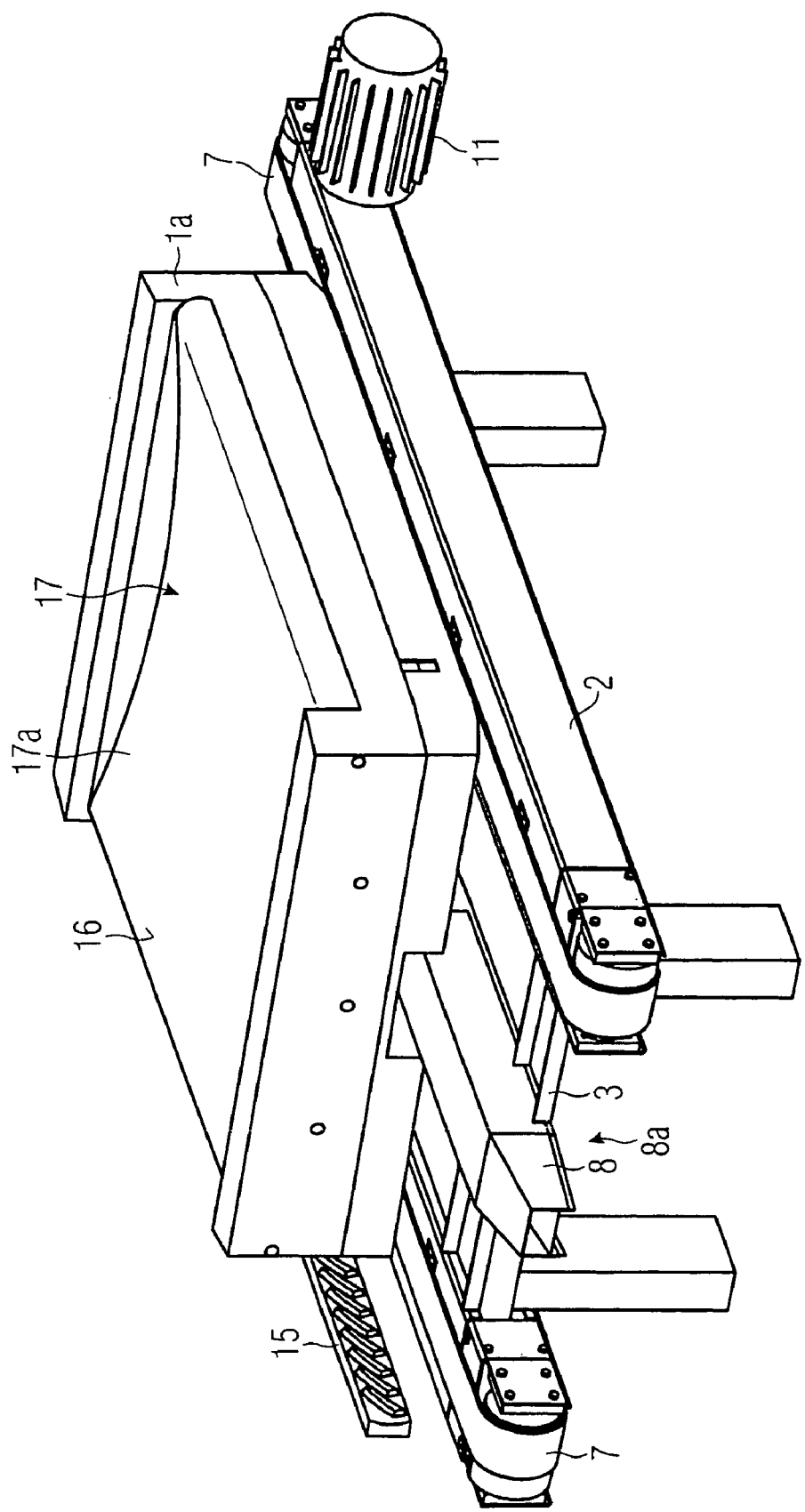
FIG. 3 shows the conveyor of FIG. 1, with a container in position and a switched-in motion link.

FIG. 3 shows a conveyor 1 with a container 1a placed thereon and a motion link 15 that has been switched in externally. The link 15 can be switched in, for example, by pivoting the motion link 15 about a pivot axis extending parallel to the longitudinal dimensions of the motion link 15. The motion link 15 is part of the loading and unloading means, and is arranged at the loading and unloading stations next to the passing containers 1a. As seen in FIG. 3, the support surface 16 of the container 1a for the individual items is formed by the upper belt section 17a of an endless conveyor belt 17 that revolves transversely to the transport direction.

Figure 4:
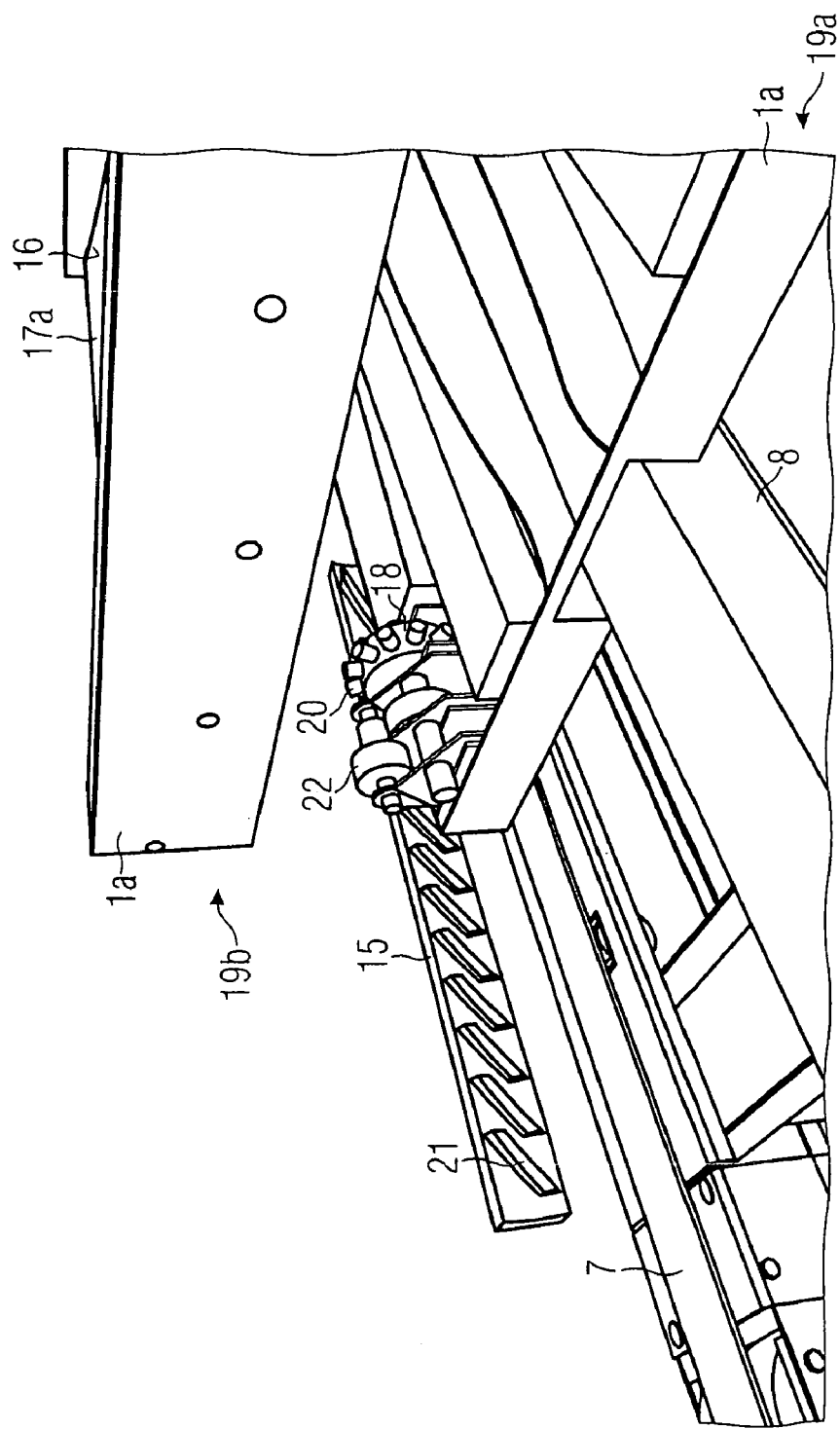
FIG. 4 shows an enlarged detail of the conveyor of FIG. 3, with the upper section of the container raised.

As illustrated in FIG. 4, the conveyor belt 17 is driven by a pinwheel 18 that is rotatably supported on the lower portion 19a of the container. FIG. 4 shows an exploded view of the two-part container 1a, with the upper container portion 19b in a raised position. As seen in FIGS. 2 and 3, the pinwheel 18 is obscured from view by the container and is visible only when the upper portion 19b is raised—as shown in FIG. 4. The pinwheel 18 has several pins 20 extending radially from the rotation axis with a uniform angular spacing. The pins 20 cooperate with the webs 21 of the motion link 17 such that the straight motion of the container 1a is converted into a rotary motion of the pinwheel 18. If will be understood that only a small fraction of the kinetic energy of the container 1a is converted into kinetic energy of the conveyor belt 17 that is driven by the pinwheel 18, so that the velocity of the passing container 1a remains essentially unchanged. During engagement of the pins 20 with the webs 21, the pins successively engage with respective recesses between two immediately adjacent webs 21 and are pushed downwardly by the motion of the container 1a. The rotation axis of the pinwheel 18 is parallel to the transport direction and connected with a drive wheel 22 by a spur gear (not shown). The lower section of the conveyor belt 17 rests on the drive wheel 22. When the container 1a is loaded onto the conveyor belt 17, the drive wheel 22 is connected to the conveyor belt 17 by friction, so that rotation of the drive wheel 22 moves the conveyor belt 17 transversely to the transport direction. The pitch and length of the motion link are selected so that the conveyor belt 17 executes at least half a revolution when passing by the switched-in motion link 15.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A transport system in particular an airport luggage transport system, for externally moving containers adapted to transport individual items along a transport path, comprising:
   at least one support element supporting a bottom side of the containers along the transport path;
   guiding means having a straight guiding section extending in a transport direction;
   loading and unloading means arranged along the transport path and including a motion link located next to the moving containers;
   a pinwheel rotatably supported on the container and having pins capable of engaging with the motion link, said motion link driving the pinwheel with kinetic energy from the passing container and switched externally into an active position by a pivoting motion; and
   an endless conveyor belt that revolves transversely to the transport direction and is driven by the pinwheel, with an upper belt section of the endless conveyor belt forming a support surface for the containers,
   wherein the bottom side of the containers includes at least one groove-shaped recess oriented in the transport direction that engages with the straight guiding section at least at a loading and unloading location.

2. The transport system of claim 1, wherein a length of the straight guiding section is greater than a length of the containers.

3. The transport system of claim 1, wherein the guiding section comprises a low-friction plastic.

4. The transport system of claim 1, wherein a rotation axis of the pinwheel extends parallel to the transport direction and the pins are oriented radially with respect to the rotation axis.

5. The transport system of claim 1, and further including a spur gear connected between the pinwheel and the upper conveyor belt.

6. The transport system of claim 1, wherein a pitch and a length of the motion link are selected so that the endless conveyor belt executes at least half a revolution when passing the motion link.

7. A transport system, in particular an airport luggage transport system, for externally moving containers adapted to transport individual items along a transport path, comprising:
   at least one support element supporting a bottom side of the containers along the transport path and including a belt that directly supports the bottom side of the containers along the transport path, wherein the at least one support element comprises a side rail with two ends and end pieces disposed on both ends and pushed over or inserted in the side rails, with the end pieces rotatably supporting belt guide rollers over which the belt passes, with a transport section of the belt extending along a top side of the side rail and a return section of the belt extending along a bottom side of the side rail;
   guiding means having a straight guiding section extending in a transport direction;
   loading and unloading means arranged along the transport path and including a motion link located next to the moving containers;
   a pinwheel rotatably supported on the container and having pins capable of engaging with the motion link, said motion link driving the pinwheel with kinetic energy from the passing container and; and
   an endless conveyor belt that revolves transversely to the transport direction and is driven by the pinwheel, with an upper belt section of the endless conveyor belt forming a support surface for the containers,
   wherein the bottom side of the containers includes at least one groove-shaped recess oriented in the transport direction that engages with the straight guiding section at least at a loading and unloading location.

8. The A transport system, in particular an airport luggage transport system, for externally moving containers adapted to transport individual items along a transport path, comprising:
   at least one support element supporting a bottom side of the containers along the transport path;
   guiding means having a straight guiding section extending in a transport direction;
   loading and unloading means arranged along the transport path and including a motion link located next to the moving containers;
   a pinwheel rotatably supported on the container and having pins capable of engaging with the motion link, said motion link driving the pinwheel with kinetic energy from the passing container and; and
   an endless conveyor belt that revolves transversely to the transport direction and is driven by the pinwheel, with an upper belt section of the endless conveyor belt forming a support surface for the containers,
   wherein the bottom side of the containers includes at least one groove-shaped recess oriented in the transport direction that engages with the straight guiding section at least at a loading and unloading location, wherein the straight guiding section has two opposing longitudinal sides that each include at least one lateral guiding section, with the lateral guiding sections disposed on the two opposing longitudinal sides supporting two corresponding opposing side faces of the groove-shaped recess.

9. The transport system of claim 8, wherein the lateral guiding sections are formed as lateral guide rollers that protrude from the longitudinal sides and roll along the opposing side faces of the groove-shaped recess.

10. The transport system of claim 9, wherein a spaced-apart pair of lateral guide rollers is arranged at least along one of the two opposing longitudinal sides.

* * * * *